United States Patent [19]

Nakazawa et al.

[11] Patent Number: 4,922,390

[45] Date of Patent: May 1, 1990

[54] HEAD LAMP FOR MOTOR-BICYCLE WITH SLANT ANGLE CORRECTION

[75] Inventors: Yoshihiro Nakazawa; Hajime Tabata; Tooru Hasegawa, all of Wako; Hideyuki Tanabe, Yokohama, all of Japan

[73] Assignees: Honda Motor Co., Ltd., Tokyo; Stanley Electric Co., Ltd., Tokyo, Japan

[21] Appl. No.: 355,648

[22] Filed: May 22, 1989

[30] Foreign Application Priority Data

May 27, 1988 [JP] Japan ................................. 63-70238

[51] Int. Cl.5 ............................................... B62J 6/00
[52] U.S. Cl. ..................................... 362/72; 362/282; 362/322; 362/351
[58] Field of Search .................. 362/61, 72, 284, 322, 362/323, 324, 282, 351

[56] References Cited

U.S. PATENT DOCUMENTS

| 2,503,500 | 4/1950 | Lowry | 362/284 X |
| 3,939,339 | 2/1976 | Alphen | 362/72 |
| 4,024,388 | 5/1977 | Skoff | 362/72 |
| 4,075,469 | 2/1978 | Alphen | 362/72 |
| 4,443,834 | 4/1984 | Schafer et al. | 362/284 X |
| 4,868,720 | 9/1989 | Miyauchi et al. | 362/69 |

Primary Examiner—Ira S. Lazarus
Assistant Examiner—Richard R. Cole
Attorney, Agent, or Firm—Frishauf, Holtz, Goodman & Woodward

[57] ABSTRACT

A motor-bicycle head lamp includes a reflector formed in a spheroidal shape; a convex lens disposed in front of the reflector; and a shade disposed near a focal point of the convex lens substantially midway between the reflector and the convex lens. The shade is rotatable around the optical axis of the motor-bicycle head lamp in accordance with a slant angle of the body of the motor-bicycle. A slant angle sensor device is provided to rotatably drive the shade.

15 Claims, 2 Drawing Sheets

HEAD LAMP FOR MOTOR-BICYCLE WITH SLANT ANGLE CORRECTION

BACKGROUND OF THE INVENTION

The present invention relates to a head lamp, and more particularly to a head lamp suitable for motor-bicycles wherein the body of the motor-bicycles slants or inclines while turning.

A conventional head lamp for motor-bicycles which slant while turning has been constructed to compensate for the body slant, as shown in FIG. 4, such that the entirety of a head lamp 22 is caused to rotate around a light illumination axis in accordance with the slant of the body 21 so that the head lamp 22 is always maintained at a given orientation relative to the ground surface.

The mechanism for rotating the entirety of the head lamp 22 has been found, however, not to be satisfactory due to the following problems. Namely, first the mechanism requires a large drive power sufficient for smoothly following the operation of a running motor-bicycle, thus essentially resulting in bulky size which makes it substantially difficult to mount the drive unit for the head lamp on a motor-bicycle which is to be designed as light as possible. Second, employing such a mechanism for rotating the head lamp 22 becomes more and more difficult because a motor-bicycle with a cowling has become common. Such a motor-bicycle has a rectangular head lamp integrally mounted on a cowling. In such a case, the total design of the lamp and cowling must be considered.

It is therefore an object of the present invention to provide a motor-bicycle head lamp which can solve the above problems.

SUMMARY OF THE INVENTION

The above object is achieved by the motor-bicycle head lamp of the present invention which comprises a reflector formed in a spheroidal shape; a convex lens disposed in front of said reflector; a shade disposed near a focal point of said convex lens substantially midway between said reflector and said convex lens; wherein said shade is adapted to be rotatable around the optical axis of said motor-bicycle head lamp in accordance with a slant angle of the body of said motor-bicycle. Therefore, the head lamp and other necessary components can be constructed small in size and pose no design problem, since it is no longer necessary to rotate the entirety of the head lamp, thus eliminating the above-described problems with the prior art.

DETAILED DESCRIPTION OF THE EMBODIMENT

Figure 1:
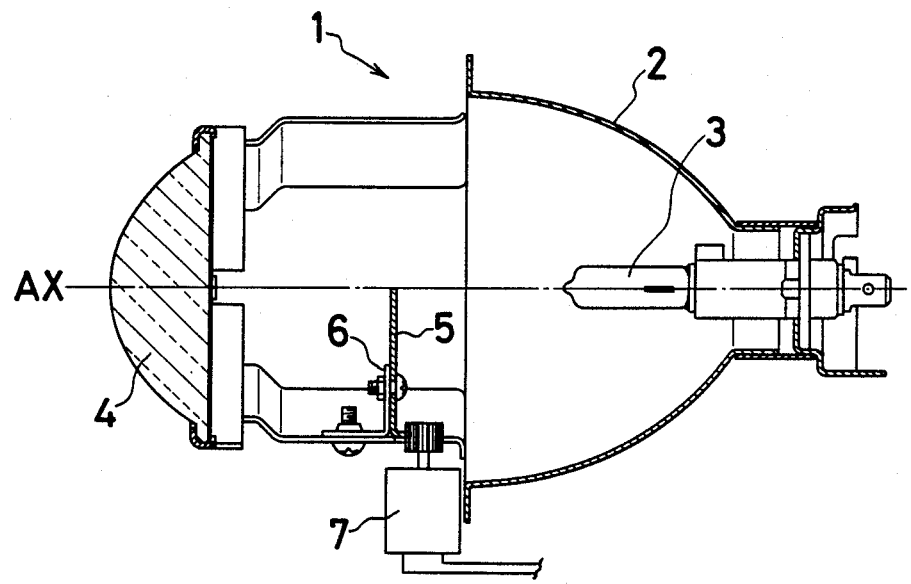
FIG. 1 is a cross-section illustrating a motor-bicycle head lamp according to an embodiment of this invention.

Referring to FIG. 1, a motor-bicycle head lamp of this invention is generally represented by reference numeral 1. The motor-bicycle head lamp 1 comprises a reflector 2 formed in a spheroidal shape, a light source 3 mounted at the first focal point of the reflector 2, a convex lens 4 for directing light applied from the light source and reflected from the reflector 2 in the direction of a predetermined light illumination angle, the reflector 2, light source 3 and convex lens 4 being all aligned on an optical axis AX. The motor-bicycle head lamp 1 further comprises a shade 5. The shade 5 has an aperture whose shape corresponds to a predetermined light distribution characteristic, and is mounted at substantially the same position as the focal point of the convex lens 4. With such a shape of the shade aperture, light can be radiated through the aperture toward the front side of the motor-bicycle in a similar manner to a slide projector, thus ensuring the predetermined light distribution characteristic.

Figure 2:
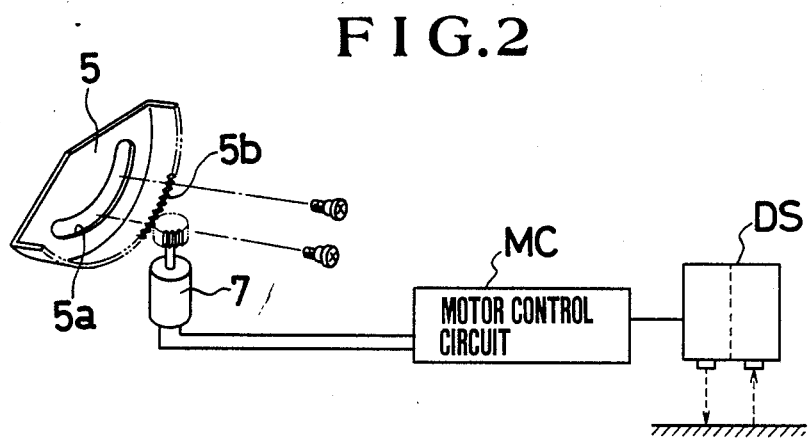
FIG. 2 is a schematic diagram showing the main portion of the embodiment of FIG. 1, including a perspective view of the shade.

The shade 5 is rotatably mounted on a holder 6 in operative association with the reflector 2, convex lens 4 and the like. As shown in FIG. 2, the shade 5 is arranged to rotate around the optical axis AX by means of an arc guide groove 5a, and is integrally formed with a gear 5b at the outer peripheral portion thereof. The gear 5b meshes with another gear which is fixedly connected to the shaft of a micro motor 7 or the like such that the shade 5 can be controlled to stop at a rotational desired angle.

Figure 3A:
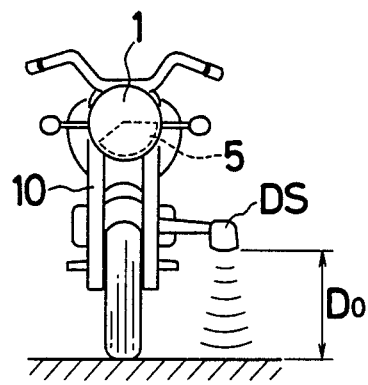
FIGS. 3A to 3C are views used for explaining the operation of the motor-bicycle head lamp of the invention.
Figure 3B:
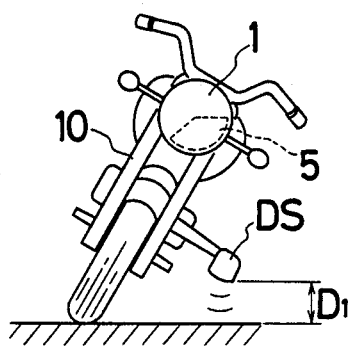
Figure 3C:
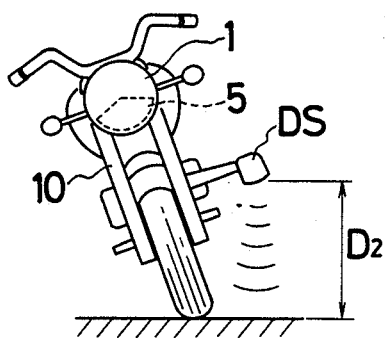
Figure 4:
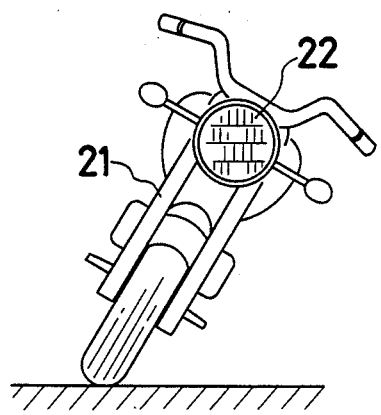
FIG. 4 is a view used for explaining a conventional motor-bicycle head lamp.

For the motor-bicycle head lamp 1 constructed above, a motor control circuit MC for controlling the micro motor 7 and a distance sensor DS comprising, for example, an ultrasonic distance sensor are provided, such that the shade 5 is driven in accordance with an output from the distance sensor DS. The operation conditions are shown in FIGS. 3A to 3C. As shown in FIG. 3A, a distance D0 between the distance sensor DS and the ground surface is used as a reference distance during an ordinary running where the body 10 stands upright. If the body 10 slants to the left while turning to the left as shown in FIG. 3B, the micro motor 7 is caused to rotate, e.g., in the clockwise direction by an amount corresponding to a difference between distances D0 and D1.

Therefore, the shade 5 is caused to rotate until it takes the same angle relative to the ground surface as that when the body 10 stands upright. On the contrary, if the body 10 slants to the right while turning to the right as shown in FIG. 3C, the micro motor 7 is caused to rotate in the counter-clockwise direction by an amount corresponding to a difference between distances D0 and D3. Therefore, the shade 5 is caused to rotate until it takes the same angle relative to the ground surface as that when the body 10 stands upright. In the above manner, the light distribution characteristic of the head lamp 1 is maintained constant irrespective of the posture or slant of the body 10. As appreciated from the above, the motor control circuit MC for controlling and driving the micro motor 7 may use a known servo control circuit commonly employed in measuring circuits, with slight modification given thereto.

As seen from the foregoing description of the present invention, the shade is caused to rotate around the optical axis of the motor-bicycle head lamp in accordance with the slant angle of the motor-bicycle body. Thus, a head lamp capable of obtaining, irrespective of the posture of the body, a light distribution characteristic the same as that when the body stands upright can be realized by rotating only the very light-weight shade. Therefore, a low power micro motor can be used. Further, the drive unit can be miniaturized to facilitate mounting it on the motor-bicycle. Furthermore, a reflector, lens and other components can be fixedly mounted on the body so that, for example, a rectangular head lamp with a cowling may be used with a greater degree of design freedom.

What is claimed:

1. A motor-bicycle head lamp for mounting to a body of a motor-bicycle, comprising:
    a reflector formed in a spheroidal shape, and having an optical axis;
    a convex lens disposed in front of said reflector;
    a shade disposed near a focal point of said convex lens between said reflector and said convex lens; and
    means for rotatably mounting said shade so that said shade is rotatable about said optical axis, relative to said reflector and lens, in accordance with a slant angle of the body of said motor-bicycle.

2. The head lamp of claim 1, wherein said shade is disposed substantially midway between said reflector and said convex lens.

3. The head lamp of claim 1, further comprising drive means coupled to said shade for rotatably driving said shade about said optical axis in accordance with said slant angle.

4. The head lamp of claim 3, further comprising sensing means coupled to said motor-bicycle body for sensing said slant angle, said drive means being responsive to said sensed slant angle for rotatably driving said shade.

5. The head lamp of claim 4, wherein said drive means includes means for rotatably driving said shade by an angle corresponding to said sensed slant angle.

6. The head lamp of claim 5, wherein said angle over which said shade is driven by said drive means is substantially equal to said slant angle.

7. The head lamp of claim 3, wherein said drive means includes means for rotatably driving said shade by an angle corresponding to said sensed slant angle.

8. The head lamp of claim 7, wherein said angle over which said shade is driven by said drive means is substantially equal to said slant angle.

9. The head lamp of claim 3, wherein said drive means includes a gear means for rotatably driving said shade.

10. The head lamp of claim 9, wherein said gear means includes a motor driven gear arrangement.

11. The head lamp of claim 1, further comprising driving means coupled to said shade for rotatably driving said shade in accordance with a sensed distance of a given part of said motor-bicycle body from the ground.

12. The head lamp of claim 11, wherein said driving means includes:
    distance sensing means for sensing a distance between a given part of said motor-bicycle body from the ground during running of said motor-bicycle, said slant angle being a function of said sensed distance;
    control means coupled to said sensing means for determining a difference between said sensed distance and a reference value; and
    means responsive to said determined difference for rotatably driving said shade about said optical axis in accordance with said determined difference to thereby maintain said shade at a predetermined substantially constant angle relative to the ground irrespective of said slant angle.

13. The head lamp of claim 12, wherein said distance sensing means is fixed to said motor-bicycle body.

14. The head lamp of claim 13, wherein said distance sensing means project sideways from said motor-bicycle body by a given distance.

15. The head lamp of claim 1, wherein said shade is rotatably mounted and includes an arcuate guide groove therein for guiding rotation thereof.

* * * * *